May 5, 1964  P. I. NIPPES  3,132,296
DYNAMOELECTRIC MACHINE EXCITATION SYSTEM
Filed Feb. 1, 1960  2 Sheets-Sheet 1

INVENTOR.
PAUL I. NIPPES
BY Herman Seid
ATTORNEY.

May 5, 1964  P. I. NIPPES  3,132,296
DYNAMOELECTRIC MACHINE EXCITATION SYSTEM
Filed Feb. 1, 1960  2 Sheets-Sheet 2
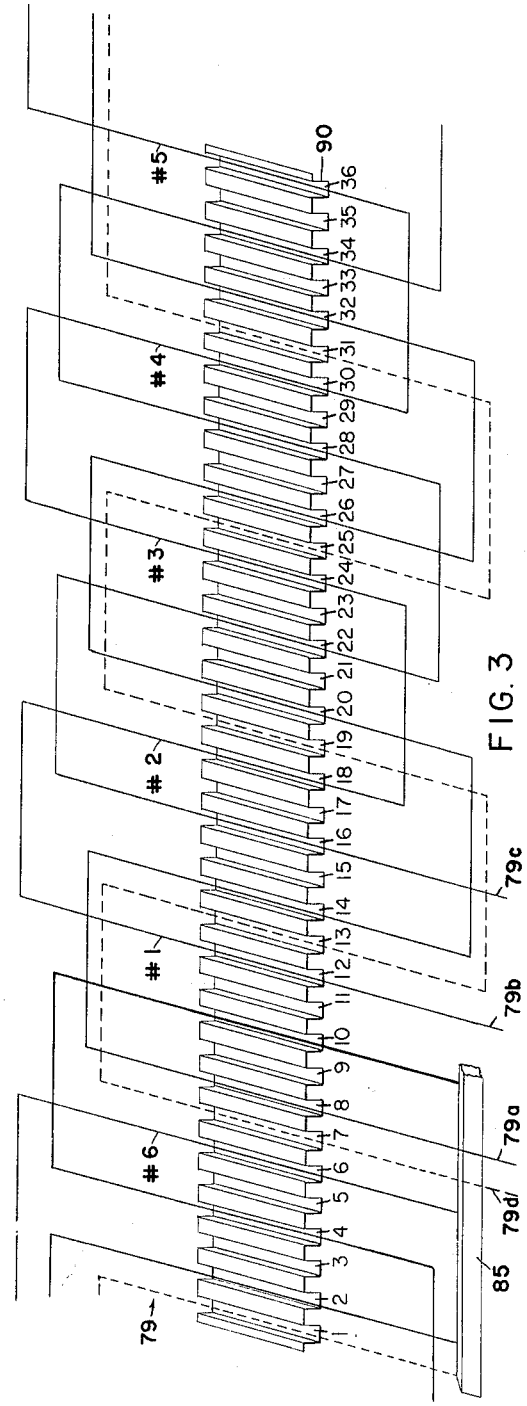
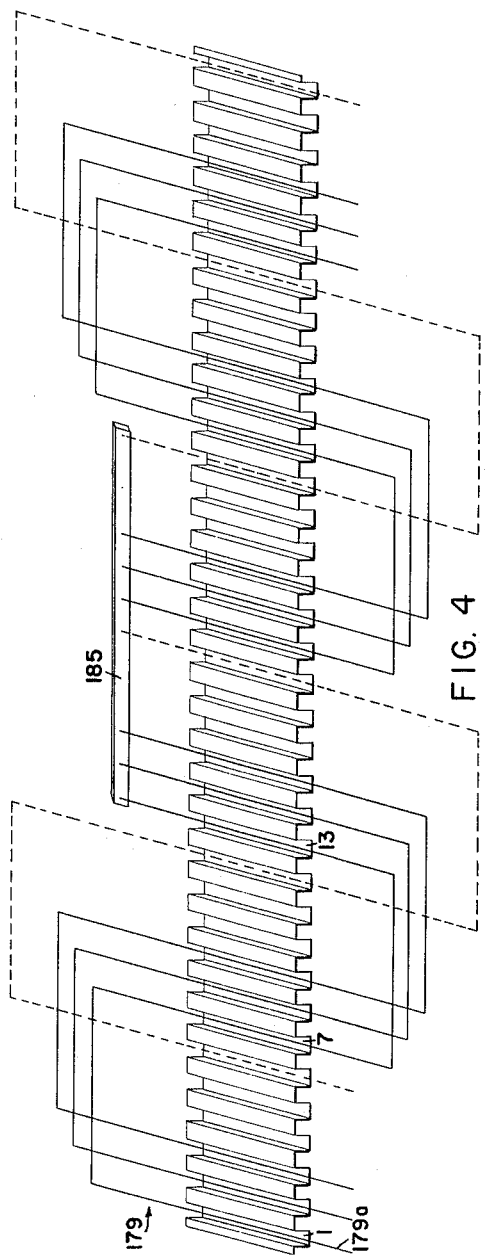
INVENTOR.
PAUL I. NIPPES
BY Herman Seid
ATTORNEY.

United States Patent Office 3,132,296
Patented May 5, 1964

3,132,296
DYNAMOELECTRIC MACHINE EXCITATION
SYSTEM
Paul I. Nippes, Ridgway, Pa., assignor to Carrier Corporation, Syracuse, N.Y., a corporation of Delaware
Filed Feb. 1, 1960, Ser. No. 5,948
22 Claims. (Cl. 322—58)

This invention relates to dynamoelectric machines and more particularly to a dynamoelectric machine having an additional winding for a source of power.

In a design of a dynamoelectric machine such as a synchronous machine, it is necessary to provide direct current excitation to the field winding of the machine. However, prior systems which have been proposed for exciting a dynamoelectric field winding having had certain undesirable characteristics which have resulted in otherwise unnecessary limitations being imposed upon the machine.

For example, one approach to the problem of excitation of dynamoelectric machinery has involved placing an exciter on a common shaft in tandem with the machine. The exciter is then designed to generate an alternating current which may be subsequently mechanically or electrically rectified to provide a unidirectional current for excitation of the field winding of the dynamoelectric machine. It is apparent that this scheme involves the disadvantage of having to operate a separate rotating machine in order to excite the dynamoelectric machine which consequently enlarges the size, weight, and complexity of the overall system as well as materially raising the initial cost of the system. In addition, the introduction of a separate exciter results in having an additional piece of machinery which creates additional alignment and insulation problems and is a source of noise and bearing problems. Furthermore, such a system may require either additional brushes and sliprings or a commutator which are frequent causes of trouble requiring shutdown of the apparatus for repair. As an alternative scheme in the case of an alternating current exciter, a rotating rectifier assembly may be attached to the common shaft of the dynamoelectric machine and its exciter, but it will be apparent that the high centrifugal force developed in machinery of this character increases the likelihood of failure of a rectifier component and that such failure is difficult to repair because of the inaccessibility of the rectifier on the rotating shaft consequently requiring dismantling of the machine. Also, such dynamoelectric machines must either have relatively long integral shafts which create problems in dismantling the machine for repair or they must have coupled shafts which create problems of making electrical connections through the coupling in addition to those of alignment and balancing.

Another approach to the excitation problem for dynamoelectric machines involves feeding back a fraction of the armature current to the field winding through a rectifier assembly. This approach poses the disadvantages that expensive transformers and compensating controls are required and that otherwise useful energy is extracted from the armature of the machine and in the case of a generator requires that larger currents flow in the armature and field windings in order to properly excite the machine. The excess of armature and field current required to excite the machine causes additional heating of the generator which in turn limits its capacity and frequently requires additional cooling of the generator for an acceptably high capacity from a given size machine.

Analysis has shown that in any dynamoelectric machine certain distortions in the armature voltage wave shape are produced, due primarily to pole face contour or field winding distribution and saturation of the rotor teeth.

These distortions are frequent sources of telephone interference and contribute nothing to the operation of the machine. Therefore, these distortions desirably should be held to a minimum.

If the flux wave distortions in a dynamoelectric machine could be utilized to provide the excitation required by the machine, it becomes immediately apparent that three highly desirable results are achieved. First, the exciter or other power consuming apparatus is eliminated together with those sources of failure of the dynamoelectric machine which are occasioned thereby. Second, since the flux wave distortions are utilized for excitation of the machine, they are reduced without the loss of desirable energy and, in fact, their removal actually improves the characteristics of the machine by making the voltages generated therein, more nearly sinusoidal in character. Third, the power provided by the flux wave distortions may also be utilized to energize other machinery associated with the dynamoelectric machine such as water pumps in the case of a water or steam turbine generator or a refrigeration compressor in the case of a refrigerant cooled machine.

Accordingly, it is the principal object of this invention to provide a dynamoelcetric machine having an improved excitation system which utilizes distortion products which are generated by the distorted flux wave characteristic of the machine.

It is a further object of this invention to provide an improved dynamoelectric machine having means to utilize the flux distortions therein in a manner to perform useful work.

It is a further object of this invention to provide an improved means for securing a winding in place on a dynamoelectric machine.

It is a further object of this invention to substitute a simple winding on the main machine in place of a separate exciter.

It is a further object of this invention to provide an additional winding in a dynamoelectric machine from which excitation current may be drawn.

It is a still further object of this invention to provide an improved method of operating a dynamoelectric machine.

These and other objects of this invention are achieved in the illustrated embodiments described by the provision of an additional winding on the armature of a dynamoelectric machine, which winding may desirably have the characteristic of having induced therein, a voltage resulting from the distortions of the flux wave produced in the machine, while at the same time, little or no net voltage of the fundamental operating frequency of the machine is induced in the winding. For example, an analysis of the operating characteristics of a generator discloses that the voltage wave shape of its armature can be partially described as the sinusoidal sum of the fundamental generator armature voltage and an odd harmonic frequency of the fundamental. The additional winding advantageously may be designed to have induced therein, the odd harmonic voltage determined to be produced in the generator while cancelling the induced fundamental voltage at its terminals. The harmonic current generated in the additional winding may be rectified and supplied to the generator field winding for excitation of the machine. It has been found that an additional armature winding designed to have induced therein a harmonic voltage does, in fact, produce sufficient current for excitation of the machine. Further, it has been found that sufficient excess power is available from a harmonic winding to operate other electrical equipment in addition to or instead of supplying the excitation requirements of its associated generator.

A preferred method and means for the carrying out of this invention will become apparent to those skilled in the art, by reference to the following specification and attached drawings wherein:

FIGURE 3 is a developed view of the armature of a dynamoelectric machine having one form of an excitation winding constructed in accordance with this invention; and FIGURE 4 is a developed view of the armature of a dynamoelectric machine embodying a modified form of excitation winding in accordance with this invention.

Figure 1:
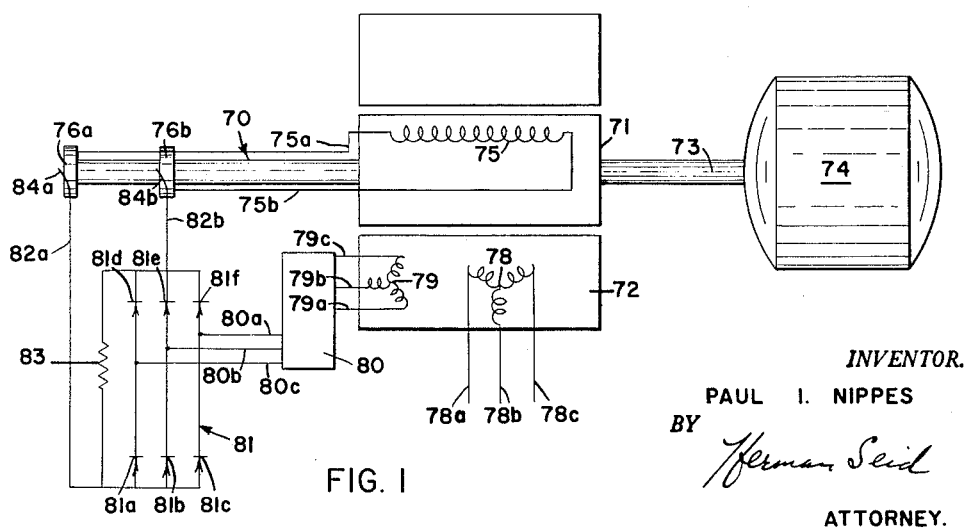
FIGURE 1 is a schematic diagram of a dynamoelectric machine embodying this invention.

Referring particularly to FIGURE 1, there is shown a schematic diagram of a dynamoelectric machine 70 embodying the principles of this invention. Dynamoelectric machine 70 comprises rotor member 71 and stator member 72. Shaft 73 connects rotor member 71 to a prime mover or mechanical load 74. It will be appreciated that 74 represents a prime mover such as a steam or water turbine in the event that dynamoelectric machine 70 is a generator and that 74 represents a mechanical load in the event that dynamoelectric machine 70 represents an electric motor. It will be appreciated that if dynamoelectric machine 70 is a synchronous condenser that element 74 would be omitted.

Dynamoelectric machine 70 has a field winding 75 which in the illustrated embodiment is wound on rotor member 71 in accordance with common practice in the art. It will be understood that the field winding may be wound either on the rotor or stator members if desired, but that it is generally more convenient to wind the field winding on the rotor member to avoid the disfavored use of high current carrying sliprings required with a rotating armature. Conductors 75a and 75b connect the terminals of field winding 75 to sliprings 76a and 76b respectively.

Armature winding 78, in the illustrated embodiment, is wound on stator 72 and is of the three-phase star-connected type having conductors 78a, 78b and 78c connected to its output terminals. Stator member 72 is also provided with an additional or harmonic excitation winding 79 adjacent armature winding 78 which, in the illustrated embodiment, is also of the three-phase star-connected type having conductors 79a, 79b, 79c connected to its output terminals. By adjacent, it is meant that the additional or harmonic winding is positioned adjacent the armature winding in the sense that at least a portion of the flux which links the armature winding also links the harmonic winding. The current output of harmonic excitation winding 79 is conducted by means of conductors 79a, 79b, 79c to excitation control 80 having excitation current output conductors 80a, 80b, 80c. Excitation control 80 may comprise a plurality of saturable reactors and other electrical circuitry designed both to control the magnitude of the excitation supplied to field winding 75 of dynamoelectric machine 70 and to regulate the excitation current supplied to maintain the same at a desired value of current. Conductors 80a, 80b, 80c supply an alternating excitation current to the input terminals of rectifier assembly 81 which in the illustrated embodiment is of the full wave polyphase type and comprises diodes 81a, 81b, 81c, 81d, 81e, 81f. A unidirectional current from the output terminals of rectifier assembly 81 is supplied to brushes 84a and 84b through rectifier output conductors 82a and 82b respectively. If desired, a thyrite resister or other voltage limiting device 83, which characteristically has a breakdown point such that it limits the voltage drop across it to a voltage substantially above the normal excitation voltage of the dynamoelectric machine, may be placed in parallel across the output terminals of rectifier assembly 81 in order to prevent high reverse voltage or current surges from damaging the diodes in the rectifier assembly.

Figure 2:
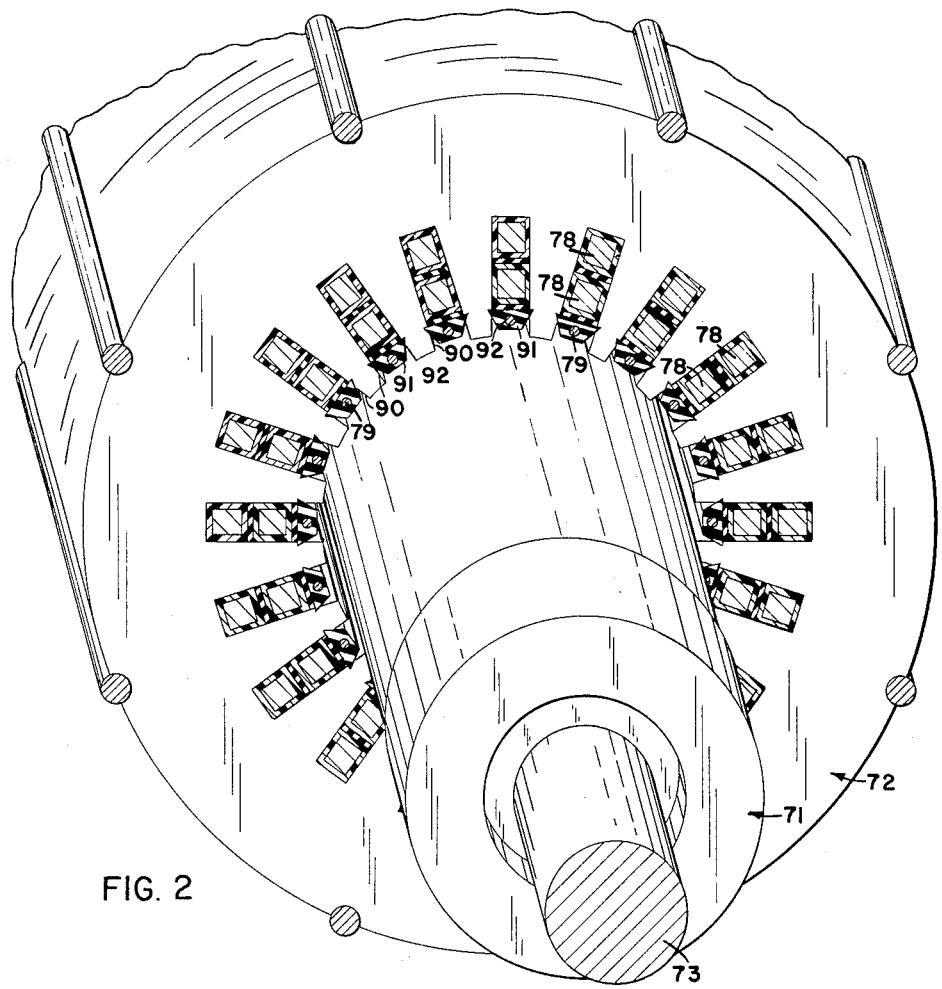
FIGURE 2 is a perspective cut-away view, partly in section, of a dynamoelectric machine according to this invention.

In FIGURE 2, shaft 73 is illustrated as carrying rotor member 71 on which field winding 75 is wound and which may be any convenient type of winding having a plurality of poles. Stator member 72 carries armature winding 78 wound in a plurality of peripherally spaced armature slots 90 on the inner diameter of the stator member. In the illustrated embodiment two conductors of armature winding 78 are shown in each slot 90 as will be understood by those skilled in the art. Conductors 78 may desirably comprise a number of insulated copper strands which, for purposes of illustration, are shown to be solid in the drawing.

Retained in the top of slots 90 are slot sticks 91 which may be made of an insulating material and which serve the purpose of retaining armature winding 78 in place. In addition, slot sticks 91 are provided with means associated with the slot sticks which is illustrated as an axial passage 92 through the slot sticks of sufficient size to accommodate the conductors and having an inner wall for the purpose of retaining the conductors which comprise the harmonic excitation winding 79 in position on the machine. Positioning excitation winding 79 in axial passages in slot sticks 91, provides a convenient means of holding the excitation winding in place and it will be observed that it does not increase the size of the dynamoelectric armature required. It will be understood that by this means a harmonic excitation winding, of the nature to be subsequently described, may be provided in dynamoelectric machines of existing design without significant modification thereof and may be conveniently added to presently existing machines by the mere replacement of the existing slot sticks with those having the proper passages 92 therein. The means associated with the slot sticks to hold the harmonic excitation winding in position may take other forms, such as channels, than the axial passages illustrated.

Harmonic excitation winding 79 will be more completely understood by reference to FIGURE 3 wherein a developed view of the inner periphery of armature 72 is shown. Stator slots 90 are illustrated as being equally spaced from one another about the inner periphery of the stator member and are indicated by consecutively numbered reference numerals 1–36. The three phases of harmonic winding 79 are illustrated in FIGURE 3 as comprising phase windings 79a, 79b, 79c, having a conductor positioned in slots 8, 12, 16 respectively.

Considering phase winding 79a of the harmonic winding, it will be observed that it passes through slots 8, 14, 20, 26, 32 and 2. Phase winding 79b of harmonic winding 79 is representative of a typical 3rd harmonic winding which would be constructed in a two pole generator having 36 armature winding slots. Conductor #1 of winding 79b lies in slot 12 of the consecutively numbered armature slots. Conductor #1 is in series with conductor #2 which lies in slot 18 and the series continues with succeeding conductors #3, #4, #5, and #6 in slots 24, 30, 36, and 6 respectively to form a complete 3rd harmonic winding. In the example given, phase winding 79b comprises six conductors each positioned six slots apart to form a complete 3rd harmonic winding. Additional 3rd harmonic windings 79a and 79c having their first conductor positioned in slots 8 and 16 respectively, are shown. The first conductor of each series forming phase windings 79a, 79b, and 79c are displaced from each other a distance of four slots which represents 120° of the 3rd harmonic of the fundamental generator frequency. One end of phase winding 79a is connected to neutral connection 85 to which one end or terminal of phase windings 79b and 79c are likewise connected. The remaining terminals of each of the phase windings of harmonic winding 79 form the output terminals of the winding and are connected to excitation control 80 as illustrated in FIGURE 1. In the example shown in FIGURE 3, with conductor #6 of each of the phase windings connected to neutral 85, the remaining ends form the terminals of the phase windings of a balanced three-phase 3rd harmonic winding suitable for excitation of the field winding of the generator described. If it is desired to provide other phase numbers than the three which have been described as forming harmonic winding 79, the same may be conveniently provided by passing additional phase winding conductors through appropriate slots in the stator member in a manner which will presently be described. For example, there is shown in dotted lines, a 4th phase winding 79d, the conductors of which pass through slots 7, 13, 19, 25, 31, 1, respectively.

In order to utilize the advantages inherent in the harmonic winding of this invention, it is desirable that the harmonic excitation winding have induced therein only voltages of the desired odd harmonic frequency of the fundamental generator armature voltage. It is, therefore, desirable that the harmonic winding be so constructed as to substantially cancel at its terminals, the fundamental voltage as well as other undesirable harmonic voltages which are induced in the conductors of the harmonic winding. In order to describe the voltages generated in the armature member of a dynamoelectric machine, it is possible to combine the sinusoidal sum of the fundamental frequency and an odd harmonic thereof. Various suitable odd harmonics will be found to exist by analysis of a particular generator and any suitable odd harmonic frequency, such as the 3rd or 9th harmonics, may be employed for purposes of this invention provided that the excitation winding is suitably wound to have induced therein the desired predetermined harmonic. This feature may be achieved by the proper placement of the conductors of the harmonic winding in the armature slots 90. A balanced three-phase 3rd harmonic winding may be formed by positioning the conductors of 3rd harmonic winding 79 in such a manner as to form three windings, each of which are displaced along the stator member by an amount equivalent to 120° of the 3rd harmonic.

Other winding configurations, other phase numbers than three, and windings designed to have induced therein, higher harmonics than the 3rd harmonic previously described, may, of course, be wound adjacent the armature of a dynamoelectric machine. For example, it can be shown that if the phase-windings 79a, 79b, 79c, illustrated in FIGURE 3, are joined to form an open delta connection instead of a star connection, that a 9th harmonic winding is thereby produced the output of which has minimum values of or in other words substantially cancels both fundamental and 3rd harmonic. It is also possible to construct a harmonic winding which spans more than a single pole pitch if desired.

It is a well known fact that by proper disposition of the additional armature winding any particular flux harmonic may be used to generate a voltage having a corresponding high frequency. By use of well established principles, the additional winding may be arranged for various numbers of phases, and may consist of coils of any convenient pitch or phase belt connected in a variety of ways, all well known in the art.

The amount of voltage of any particular chosen frequency may be increased and voltage components of other frequencies may be suppressed or eliminated by choosing a coil pitch and a winding connection to suit a particular case. It will be recognized by those skilled in the art that coil pitch factors, phase belt factors, and connection factors influence the amount of various harmonic voltages appearing at the terminals of the harmonic winding.

In FIGURE 4, there is shown, a 3rd harmonic, 12 phase, star-connected winding 179 which is similar to the winding shown in FIGURE 3, but wherein each phase winding comprises three series connected conductors instead of the six conductors illustrated in FIGURE 3. For example, phase winding 179a has series connected conductors lying in slots 1, 7, 13. It will be appreciated that if these phases are loaded singly, a large component of fundamental voltage will exist in the voltage output. Using the neutral connection 185 as shown in FIGURE 4, loading may be between phases of the star connection such that there is an insignificant fundamental component in the output. For convenience of illustration, two of the phase windings have been omitted from this diagram on each side of neutral 185 and the 6th phase on each side of neutral 185 has been indicated in broken lines. It will be appreciated that when using a 12 phase harmonic winding connected in the manner illustrated in FIGURE 4, that it is desirable to employ a 12 phase rectifier assembly for converting the alternating current output of the harmonic winding to a unidirectional current for use in excitation of the dynamoelectric field.

Since it is unnecessary to use any particular harmonic for the excitation of the dynamoelectric machine described, it is advantageous to analyze the flux characteristics of the particular machine under consideration to determine what harmonics are present which have sufficient magnitude to supply the power desired both for excitation of the machine and for operation of associated equipment such as water pumps, compressors or cooling fans which it may be desired to operate from power obtained from the harmonic winding. It is likewise possible in the design of the machine to choose proportions such that sufficient voltage and capability will exist at the desired harmonic frequency to provide the necessary power. For example, the rotor pole phase contour or the rotor slotting or any of the factors affecting flux density may be modified to provide sufficient harmonic voltage and power for the desired purpose. When a suitable harmonic is found to be present in the flux wave of the dynamoelectric machine, it is then necessary to devise a winding which will cancel both the fundamental voltage induced in its phase windings as well as undesired harmonics. The winding so constructed need not be symmetrical in the manner shown by the illustrated embodiments of this invention, in the sense that each conductor of a phase winding is displaced from the preceding conductor of that phase winding one by a fixed number of slots. Instead, the conductors may be placed in any manner along the stator core which satisfies the conditions set forth above. In general, it may be said that the following relationship states the relative coefficient of the voltage induced in a particular winding for a particular harmonic:

$$\sqrt{\left(\sum_{n=n_1, n_2 \ldots}^{n=n_\mathrm{L}} (-1)^{n-1} \frac{\cos (S_n-1)\pi PX}{N}\right)^2 + \left(\sum_{n=n_1, n_2 \ldots}^{n=n_\mathrm{L}} (-1)^{n-1} \frac{\sin (S_n-1)\pi PX}{N}\right)^2}$$

where:

$n$ is the number assigned to a conductor which forms a part of a series connected harmonic winding starting from one for the first conductor and numbering consecutively for each following one in the series, $N$ is the total number of equally spaced locations (e.g., stator slots) which are, or would be present along the periphery of the dynamoelectric machine such that each conductor of the harmonic winding falls at a location (e.g., within a slot), $S_n$ is the location number (e.g., slot number) at which conductor $n$ of the harmonic winding lies starting from one and numbering each location consecutively around the periphery of the dynamoelectric machine, $x$ is the number of a harmonic, the presence of which is being investigated for a particular winding, $P$ is the number of poles of the field winding of the machine, and $n_\mathrm{L}$ is the number of the last conductor $n$ of the series of conductors which forms the harmonic winding being considered.

In applying the above formula to the investigation of a harmonic winding, it will be understood that the fundamental armature current frequency can be considered to be the first harmonic and hence, the value of $x$ in such a case is one. It will also be understood that a conductor will not necessarily lie at each of the locations referred to in the formula but that the total number of equally spaced locations is chosen such that each conductor lies at one of the locations so as to conveniently describe the physical position of a conductor relative to the other conductors of a harmonic winding. It will be seen that if each conductor lies within one of the stator slots and the stator slots are equally spaced about the inner periphery of the stator member, then it will be convenient to consecutively number the slots and use those numbers as location numbers.

In order to construct an effective harmonic excitation winding it is desirable that substantial cancellation of the fundamental and all harmonics less than the desired harmonic occur. Since it can be shown that only odd harmonics need be considered, the investigation of a particular winding may be confined to the desired odd harmonic and all odd harmonics below it including the fundamental. Consequently, the value of the expression given above should be substantially equal to zero or a relatively small value for the fundamental and for each odd harmonic below the desired one. In addition, the expression should give a value substantially greater than zero or a relatively large value for the particular odd harmonic which it is desired to employ for excitation of the dynamoelectric machine in order that an acceptably high voltage or current be available from the terminals of the harmonic winding for this purpose.

In constructing a harmonic excitation winding, the designer should attempt to choose a winding configuration which gives the highest possible voltage of the desired harmonic while at the same time maintaining the fundamental and lower harmonic voltages at a minimum value. Experimentation by use of the above formula will enable the designer to properly locate the conductors of a harmonic excitation winding for optimum performance in a machine. It will not be necessary to follow a set pattern in the placement of conductors in the various slots of the machine so any random combination of conductors in slots which gives the desired harmonic and substantially cancels the unwanted voltages may be used. Likewise, more than one conductor may occupy a single slot whether they are part of the same phase winding or of different phase windings. In this event, appropriate means associated with the slot stick of a multiple conductor carrying slot should be provided to carry the plurality of conductors.

It will be appreciated that it is desirable to construct a harmonic winding which may be positioned in the slots which are available by reason of the construction of the main armature winding of the dynamoelectric machine, but it is unnecessary to utilize only those slots and additional locations may be defined along the periphery of the machine to accommodate conductors of a particular harmonic winding desired. In that event, when employing the above formula, it will be understood that the machine may be treated as if a plurality of equally spaced slots were cut around its periphery so that each of the conductors of the harmonic winding will fall within one of the slots imagined to exist. Therefore, a definite slot number may be assigned to each of the locations in which a conductor is positioned and that number is representative of the angular position of the conductor along the periphery of the machine when compared with other locations. It is not necessary to actually provide a slot where no conductor is to be placed but such a slot may be imagined to exist for purposes of the formula given above and unless the position of the conductors of the winding are otherwise represented. Further, since the slots described are only a convenient means of expressing the angular position of the conductors of the harmonic winding, it is not actually necessary that the winding lie within the slots but practical considerations of space and mechanical rigidity make it desirable to so place them.

In practice, it is usual to construct the armature of a dynamoelectric machine on the stator member and it is convenient to employ the armature slots as locations for the conductors of the harmonic winding for the reason that the conductors may be placed in axial passages within the slot sticks thereby making it unnecessary to modify the construction of the machine or to enlarge it to accomodate the harmonic excitation winding.

The physical position of the harmonic winding is subject to many variations but a preferred position is that shown in FIGURE 2 where it occupies space not used by the main winding and where its reactance is minimized.

Taking, for example, the case of a generator, a harmonic winding is provided on the armature carrying member which, in the illustrated embodiment, is the stator. The harmonic winding is constructed to have induced therein a predetermined odd harmonic of the generator fundamental output frequency. The rotor or field carrying member of the generator is rotated and the voltage which is induced in the harmonic winding is conducted from the stator to an excitation control 80 as shown in FIGURE 1. The value of current which is to be used for excitation of the generator is regulated and adjusted as desired by the voltage regulator or the operator and is rectified by rectifier assembly 81 which desirably may have a number of phases equivalent to the number of phases of the harmonic winding and may be of the full wave type. If a polyphase excitation current is employed, it is desirable but not necessary to provide a balanced polyphase harmonic winding so as to balance the currents through the various diodes which may form the rectifier. The rectified excitation voltage, which has been converted to a unidirectional current by rectifier assembly 81, is then conducted to brushes 84 which are in engagement with sliprings 76. From sliprings 76, the unidirectional current is conducted to field winding 75 where it is employed to excite the field of the dynamoelectric machine. Upon start-up of the dynamoelectric machine, it may be found that the residual magnetism thereof is insufficient to provide the required initial excitation and hence, a small battery or other voltage source may be connected to the machine for a short interval in order to assure dependable start-up.

It will be seen that by employing this invention for excitation of a dynamoelectric machine that it is unnecessary to provide an exciter with its associated commutator and brushes and that the dynamoelectric machine is thereby enabled to be smaller in size for a given capacity. In addition, because of its relatively small size, an integral shaft type machine may be employed thereby eliminating the problems of alignment which are normally associated with dynamoelectric machine of the exciter type.

Also, a shaft of a dynamoelectric machine embodying this invention need not carry rectifiers or other special components which might be damaged by the centrifugal forces present in a machine rotating at high speed. Likewise, the problem of balancing a rotor member of a machine constructed in accordance with this invention is simplified by reason of the fact that the shaft carries fewer components and no special exciter components. Also, the cost, noise, bearing lubrication problems and other disadvantages which are attendant in the use of rotating exciter systems are eliminated by this construction.

Furthermore, since the harmonic excitation winding draws substantially only harmonics from the dynamoelectric machine, the sine wave characteristics of the machine are actually improved; the wave form of a generator output more closely approaches the desired sine wave characteristics. This is advantageous because harmonic components in the output of a generator are a frequent source of telephone interference which in extreme cases may make the generator unacceptable for use in a power generation system. In addition, the harmonic winding is isolated from the armature winding and does not require a higher current to flow therein as in the case of a machine which is excited by power drawn from the armature winding. Likewise, no additional field current is required for excitation of a harmonically excited machine. Consequently, the heating of the interior of the machine is lessened and its capacity for a given size is increased. Also, if the excitation circuit becomes short circuited, no harm is done to the armature winding because the circuits are isolated from each other.

Furthermore, auxiliary apparatus may be conveniently powered by the harmonic winding without increasing the current flowing in the armature winding and without substantially increasing the heating of the generator which would limit its capacity. Another important advantage lies in the fact that the excitation frequency is higher than the fundamental armature current and consequently the efficiency of the excitation system is excellent. Likewise, all of the excitation components are stationary and easily available for servicing or replacement, should the same become necessary, without the necessity for shutting down or dismantling the dynamoelectric machine. The excitation system described is also characterized by low initial cost, high efficiency and great simplicity due to the elimination of a separate exciter.

It will be understood that this invention is not limited to the embodiments described and illustrated but may otherwise be embodied as defined within the scope of the following claims.

I claim:

1. A dynamoelectric machine having a field winding, an armature winding adapted to have a fundamental frequency voltage generated therein by said field winding and a harmonic winding comprising at least one phase winding having a pole number greater than the pole number of said field winding, said harmonic winding being constructed so as to have generated therein by said field winding and appearing at its terminals a voltage having a frequency which is a predetermined odd harmonic of the fundamental frequency of an alternating voltage generated in said armature winding, said phase winding being further designed to substantially cancel voltages of said fundamental frequency.

2. An dynamoelectric machine as defined in claim 1, including rectifier means and wherein the voltage generated in said harmonic winding is rectified by said rectifier means and conducted to said field winding for excitation thereof.

3. A dynamoelectric machine as defined in claim 1 including auxiliary electrical equipment and means to conduct a harmonic current generated in said harmonic winding to supply power for operation of said auxiliary electrical equipment.

4. A self excited dynamoelectric machine comprising a rotor member having a field winding thereon, a stator member having an alternating current armature winding thereon adapted to have a fundamental frequency voltage generated therein by said field winding, said stator member further having a harmonic winding thereon having a number of poles which is an integral odd multiple of the number of poles of said field winding adapted to have generated therein by said field winding a voltage substantially consisting of a predetermined odd harmonic of the fundamental frequency of an alternating voltage generated in said armature winding, means to convert the harmonic current drawn from said harmonic winding to a unidirectional current and means to supply said unidirectional current to said field winding for excitation of said machine.

5. A dynamoelectric machine as defined in claim 4 wherein said machine comprises an alternating current generator and a stationary rectifier means having input and output terminals, conductor means connecting a terminal of said harmonic winding with said input terminal of said rectifier means and conductor means connecting the output terminals of said rectifier means to said field winding to excite said generator.

6. A self excited dynamoelectric machine having an alternating current armature winding adapted to have a fundamental frequency voltage generated therein by said field winding, a field winding, and a harmonic winding adjacent said armature winding having a number of poles which is an integral odd multiple of the number of poles of said field winding, said harmonic winding being constructed so as to have generated therein by said field winding substantially only a voltage having a frequency which is a predetermined odd harmonic of the fundamental frequency of the voltage generated in said armature winding, rectifier means to convert the current drawn from said winding to a unidirectional current and conductor means to supply said unidirectional current to said field winding for energization thereof.

7. A dynamoelectric machine as defined in claim 6 wherein said machine has a rotor member and a stator member, said field winding being wound on said rotor member and said armature winding being wound on said stator member, said stator member having an inner diameter and being provided with a plurality of slots peripherally spaced about said inner diameter thereof, said armature winding being disposed in at least some of said slots, slot sticks adjacent the tops of said slots retaining said armature winding in said slots, means associated with said slot sticks to retain said harmonic winding in a predetermined position with respect to said slot sticks and said harmonic winding being retained by at least some of said means associated with said slot sticks so that the size of said machine is not substantially enlarged by the provision of said harmonic winding.

8. A dynamoelectric machine as defined in claim 7 wherein said harmonic winding comprises a plurality of conductors each of which are located within a slot in said stator member.

9. A dynamoelectric machine having a field winding, an armature winding and an additional winding adjacent said armature winding, said dynamoelectric machine comprising a rotor member and a stator member, a plurality of slots in one of said members, said armature winding being disposed in said slots, slot sticks retaining said armature winding in said slots, and means associated with said slot sticks to retain said additional winding fixed with respect to its associated member.

10. A dynamoelectric machine as defined in claim 9 wherein said slot sticks have an axial passage therethrough and said means associated with said slot sticks comprises a wall of said passage, said additional winding comprising a plurality of conductors and at least one of said conductors being positioned within one of said axial passages and retained by a wall thereof.

11. A dynamoelectric machine as defined in claim 9 wherein said armature winding is wound in slots in said stator member and said additional winding comprises an excitation winding retained in said slots in said stator member adjacent said armature winding by said slot sticks.

12. A dynamoelectric machine comprising a field winding having a plurality of poles, an armature winding adapted to have a fundamental frequency voltage generated therein by said field winding, and a harmonic winding having a number of poles greater than the number of poles of said field winding and adapted to have a harmonic voltage generated therein by said field winding comprising a plurality of series connected conductors, said dynamoelectric machine having a plurality of locations at which the conductors of said harmonic winding are positioned, said harmonic winding being constructed such that:

$$\sqrt{\left(\sum_{n=n_1, n_2...}^{n=n_L} (-1)^{n-1} \frac{\cos\ (S_n-1)\pi PX}{N}\right)^2 + \left(\sum_{n=n_1, n_2...}^{n=n_L} (-1)^{n-1} \frac{\sin\ (S_n-1)\pi P}{N}\right)^2}$$

is a relatively large value for the desired harmonic frequency of the generator fundamental which it is desired to generate in the harmonic winding and a relatively small value for said fundamental frequency and for harmonics thereof lower than the desired harmonic frequency where:

$n$ is the number consecutively assigned to a conductor of the series of conductors forming said harmonic winding, $N$ is the total number of equally spaced locations necessary to provide locations in said machine at points where it is desired to locate conductors of the harmonic winding, $S_n$ is the number of the location, numbered consecutively in which conductor $n$ of the harmonic winding is located, $x$ is the number of a harmonic which is being investigated, $P$ is the number of poles of the field winding, and $n_L$ is the number of the last conductor $n$ of the series of conductors which forms the harmonic winding.

13. A dynamoelectric machine as defined in claim 12 wherein said harmonic winding comprises a polyphase winding and wherein each phase winding thereof satisfies the conditions set forth.

14. A dynamoelectric machine as set forth in claim 13 wherein said polyphase harmonic winding comprises a substantially balanced polyphase winding so that the voltage generated therein is adapted to be rectified to produce a relatively uniform unidirectional current for excitation of said machine.

15. A dynamoelectric machine as defined in claim 12 wherein said locations of the conductors of said harmonic winding each coincide with one of said slots.

16. A dynamoelectric machine having an alternating current armature winding, a field winding and an additional winding, stationary rectifier means, means to conduct a voltage generated in said additional winding to said rectifier means, means to conduct a unidirectional current output of said rectifier to said field winding for excitation of said dynamoelectric machine, said voltage generated in said additional winding by said field winding comprising substantially only a harmonic of the voltage generated in said armature winding by said field winding.

17. A dynamoelectric machine having an alternating current armature winding, a field winding and an additional winding, stationary rectifier means, means to conduct a voltage generated in said additional winding to said rectifier means, means to conduct a unidirectional current output of said rectifier to said field winding for excitation of said dynamoelectric machine, said voltage generated in said additional winding by said field winding consisting of substantially only an odd harmonic of the voltage generated in said armature winding by said field winding.

18. A power generation system comprising: a steam turbine driven electrical generator having a field winding, an armature winding adapted to have a fundamental frequency voltage generated therein by said field winding, and a harmonic winding; said harmonic winding being constructed so as to have generated therein by said field winding and appearing at its terminals a voltage having a frequency which is a predetermined odd harmonic of the fundamental frequency of the alternating main generator output voltage generated in said armature winding by said field winding while substantially canceling voltages of said fundamental frequency; and a water pump associated with said system, said water pump being electrically connected to and powered by the current output of said harmonic winding.

19. A power generation system comprising: a steam turbine driven electrical generator having a field winding, an armature winding, and a harmonic winding; said harmonic winding being constructed so as to have generated therein by said field winding and appearing at its terminals a voltage having a frequency which is a predetermined odd harmonic of the fundamental frequency of the alternating main generator output voltage generated in said armature winding by said field winding while substantially canceling voltages of said fundamental frequency; a water pump associated with said system, said water pump being electrically connected to and powered by the current output of said harmonic winding, and a rectifier for rectifying a portion of the harmonic current output of said harmonic winding, said field winding being connected to said rectifier so as to be excited by the rectified current component of the output current of said harmonic winding.

20. A dynamoelectric machine as defined in claim 3 including a boiler feed pump electrically connected to said harmonic winding and powered by the harmonic current output thereof.

21. A self excited dynamoelectric machine having an alternating current armature winding, a field winding, and a harmonic winding adjacent said armature winding, said harmonic winding being constructed so as to have generated therein by said field winding substantially only a current having a frequency which is a predetermined odd harmonic of the fundamental frequency of the current generated in said armature winding by said field winding, rectifier means to convert current drawn from said winding to a unidirectional current and conductor means to supply said unidirectional current to said field winding for energization thereof, said harmonic winding being physically disposed in said dynamoelectric machine between said field winding and said armature winding.

22. A dynamoelectric machine comprising a field winding having a plurality of poles, an armature winding adapted to have a fundamental frequency voltage generated therein by said field winding, and a harmonic winding having a number of poles greater than the number of poles of said field winding and adapted to have a harmonic voltage generated therein by said field winding comprising a plurality of series connected conductors, said dynamoelectric machine having a plurality of locations at which the conductors of said harmonic winding are positioned, said harmonic winding being constructed such that:

$$\sqrt{\left(\sum_{n=n_1, n_2...}^{n=n_L} (-1)^{n-1} \frac{\cos\ (S_n-1)\pi PX}{N}\right)^2 + \left(\sum_{n=n_1, n_2...}^{n=n_L} (-1)^{n-1} \frac{\sin\ (S_n-1)\pi PX}{N}\right)^2}$$

is a relatively large value for the desired harmonic frequency of the generator fundamental which it is desired to generate in the harmonic winding and a relatively small value for said fundamental frequency and for harmonics thereof lower than the desired harmonic frequency where:

$n$ is the number consecutively assigned to a conductor of the series of conductors forming said harmonic winding, $N$ is the total number of equally spaced locations necessary to provide locations in said machine at points where it is desired to locate conductors of the harmonic winding, $S_n$ is the number of the location, numbered consecutively in which conductor $n$ of the harmonic winding is located, $x$ is the number of a harmonic which is being investigated, P is the number of poles of the field winding, and $n_L$ is the number of the last conductor $n$ of the series of conductors which forms the harmonic winding and rectifier means, said field winding being connected to the output of said rectifier means and said harmonic winding being connected to the input of said rectifier means so that said dynamoelectric machine is excited only by current derived from said harmonic winding.

References Cited in the file of this patent

UNITED STATES PATENTS

| | | |
|---|---|---|
| 1,227,414 | Field | May 22, 1917 |
| 1,231,588 | Frederick et al. | July 3, 1917 |
| 2,486,656 | Klinkhamer | Nov. 1, 1949 |
| 2,917,699 | Grant | Dec. 15, 1959 |

FOREIGN PATENTS

| | | |
|---|---|---|
| 1,050,847 | France | Sept. 9, 1953 |

UNITED STATES PATENT OFFICE
CERTIFICATE OF CORRECTION

Patent No. 3,132,296  May 5, 1964

Paul I. Nippes

It is hereby certified that error appears in the above numbered patent requiring correction and that the said Letters Patent should read as corrected below.

Column 1, line 16, for "having" read -- have --; column 2, line 26, for "dynamoelcetric" read -- dynamoelectric --; column 8, lines 11 and 12, for "accomodate" read -- accommodate --; columns 11 and 12, claim 12, the extreme right-hand portion of the equation reading:

$$\left(\frac{\sin (S_n - 1)\pi P}{N}\right)^2 \quad \text{read} \quad \left(\frac{\sin (S_n - 1)\pi PX}{N}\right)^2$$

Signed and sealed this 12th day of January 1965.

(SEAL)
Attest:

ERNEST W. SWIDER
Attesting Officer

EDWARD J. BRENNER
Commissioner of Patents